(12) United States Patent
Kim et al.

(10) Patent No.: US 8,873,130 B2
(45) Date of Patent: Oct. 28, 2014

(54) ELECTRONIC PAPER DISPLAY DEVICE AND METHOD OF FABRICATING THE SAME

(71) Applicant: Electronics and Telecommunications Research Institute, Daejeon (KR)

(72) Inventors: Joo Yeon Kim, Daejeon (KR); Kyung Soo Suh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 81 days.

(21) Appl. No.: 13/780,218

(22) Filed: Feb. 28, 2013

(65) Prior Publication Data

US 2014/0078575 A1   Mar. 20, 2014

(30) Foreign Application Priority Data

Sep. 18, 2012   (KR) .......................... 10-2012-0103348

(51) Int. Cl.
  *G02F 1/167*   (2006.01)
(52) U.S. Cl.
  CPC ....................................... *G02F 1/167* (2013.01)
  USPC .......................................................... 359/296
(58) Field of Classification Search
  CPC ........................................................ G02F 1/167
  USPC .......................................................... 359/296
  See application file for complete search history.

(56) References Cited

U.S. PATENT DOCUMENTS 6,870,662 B2 *   3/2005   Tseng et al. .................. 359/296

OTHER PUBLICATIONS

D. Sameoto et al., "Recent advances in the fabrication and adhesion testing of biomimetic dry adhesives", Smart Materials and Structures, Aug. 6, 2010, pp. 1-18, vol. 19, No. 10.

* cited by examiner

*Primary Examiner* — Joseph P Martinez
(74) *Attorney, Agent, or Firm* — Rabin & Berdo, P.C.

(57) ABSTRACT

Provided is an electronic paper display device. The electronic paper display device according to an embodiment of the present invention may include a first substrate, partition walls defining cell regions disposed on the first substrate, a first electrode disposed on a bottom surface of the cell regions, microcapsules disposed on the first electrode, a second electrode having one side facing the first electrode, and a second substrate disposed on the other side of the second electrode, in which the electronic paper display device may include first adhesive fixing parts including a plurality of patterns provided between the second electrode and the partition walls.

15 Claims, 10 Drawing Sheets

ELECTRONIC PAPER DISPLAY DEVICE AND METHOD OF FABRICATING THE SAME

CROSS-REFERENCE TO RELATED APPLICATIONS

This U.S. non-provisional patent application claims priority under 35 U.S.C. §119 of Korean Patent Application No. 10-2012-0103348, filed on Sep. 18, 2012, the entire contents of which are hereby incorporated by reference.

BACKGROUND

The present invention disclosed herein relates to an electronic paper display device and a method of fabricating the same, and more particularly, to an electronic paper display device having improved bonding characteristics between a lower substrate and an upper substrate, and a method of fabricating the same.

Electronic paper is a display having a thin and flexible form like paper and has received attention as an advanced reflective-type display satisfying visibility comparable to print on paper, flexibility, and low power consumption. Electronic paper may minimize power consumption by using bistability that may preserve an original image for a prolonged period of time, even in a state in which voltage is removed.

In an electronic paper display, particles exhibiting electrophoretic characteristics by an electric field applied under a constant voltage are disposed between an upper substrate maintaining a predetermined spacing and a lower substrate having partition walls formed thereon. The partition walls are formed on the lower substrate by using a photolithography method or a printing method.

Bonding of the upper substrate and the lower substrate in the electronic paper display may be performed by two methods. First, there is a method of bonding the partition walls formed on the lower substrate after coating an entire surface of the upper substrate with an adhesive and second, there is a method of bonding the upper substrate after selectively coating the partition walls formed on the lower substrate with an adhesive.

SUMMARY

The present invention provides an electronic paper display device having more improved mechanical strength and durability.

The present invention also provides a method of fabricating an electronic paper display device having more improved mechanical strength and durability.

The object of the present invention is not limited to the aforesaid, but other objects not described herein will be clearly understood by those skilled in the art from descriptions below.

Embodiments of the present invention provide electronic paper display devices including: a first substrate; partition walls defining cell regions disposed on the first substrate; a first electrode disposed on a bottom surface of the cell regions; microcapsules disposed on the first electrode; a second electrode having one side facing the first electrode; and a second substrate disposed on the other side of the second electrode, wherein the electronic paper display device may include first adhesive fixing parts including a plurality of patterns provided between the second electrode and the partition walls.

In some embodiments, the first adhesive fixing parts may be provided by being adhered to the second electrode.

In other embodiments, the electronic paper display device may further include second adhesive fixing parts provided by being adhered to the partition walls.

In still other embodiments, the first adhesive fixing parts may be provided by being adhered to the partition walls.

In even other embodiments, the first adhesive fixing parts may have a plurality of unevenness formed on a top surface of the partition walls.

In yet other embodiments, the microcapsule may include charged pigment particles and oil.

In other embodiments of the present invention, methods of fabricating an electronic paper display device including: preparing a first substrate and a second substrate; forming partition walls defining cell regions on the first substrate; forming first adhesive fixing parts facing the partition walls on the second substrate; coating the first adhesive fixing parts with an adhesive; and using the adhesive to bond the first substrate and the second substrate together, wherein the first adhesive fixing parts may be composed of a plurality of patterns.

In some embodiments, the forming of the first adhesive fixing parts may include: preparing a printing plate composed of uneven portions and even portions having a flat surface between the uneven portions; coating the printing plate with a curable material to fill the uneven portions; pressing the printing plate having the curable material included therein onto the second substrate to form a plurality of patterns formed of the curable material on the second substrate; and curing the patterns.

In other embodiments, the method may further include forming second adhesive fixing parts on a top surface of the partition walls.

In still other embodiments, the coating of the first adhesive fixing parts with an adhesive may include completely filling between the patterns with the adhesive.

In even other embodiments, the method may further include: forming a first electrode on a bottom surface of the cell regions before the first substrate and the second substrate are bonded together; injecting microcapsules onto the first electrode; and forming a second electrode on the second substrate to face the first electrode.

In still other embodiments of the present invention, methods of fabricating an electronic paper display device including: preparing a first substrate and a second substrate; forming partition walls defining cell regions on the first substrate and having a plurality of patterns disposed on a top surface thereof; providing an adhesive to the top surface of the partition walls; and using the adhesive to bond the first substrate and the second substrate together.

In some embodiments, the forming of the partition walls may include preparing a printing plate composed of uneven portions and even portions having a step height higher than a surface of the uneven portions and a flat surface between the uneven portions; forming a photoreactive material layer on the first substrate; and pressing the printing plate onto the photoreactive material layer to form first patterns on the first substrate.

In other embodiments, the method may further include forming adhesive fixing parts composed of a plurality of second patterns on the second substrate to face the top surface of the partition walls.

In still other embodiments, the adhesive may be provided to fill between the first patterns and between the second patterns.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE EMBODIMENTS

Figure 1A:
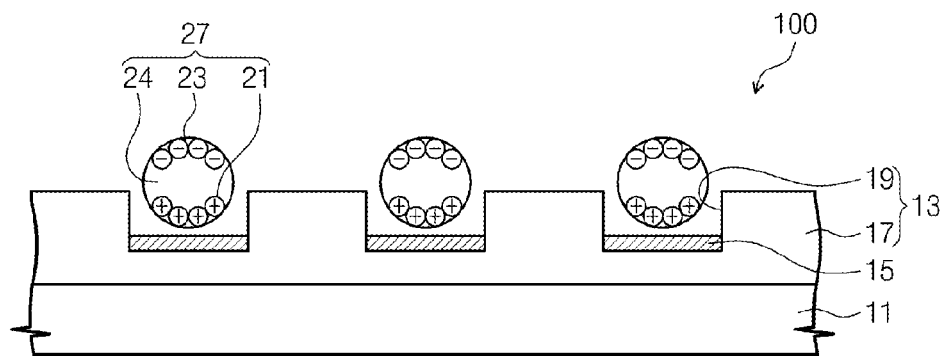
FIGS. 1A and 1B are cross-sectional views illustrating a lower structure and an upper structure of an electronic paper display according to an embodiment of the present invention, respectively.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In the drawings, like reference numerals refer to like elements throughout.

In the following description, the technical terms are used only for explaining a specific exemplary embodiment while not limiting the present invention. The terms of a singular form may include plural forms unless referred to the contrary. The meaning of "comprises" and/or "comprising" specifies a property, a region, a fixed number, a step, a process, an element and/or a component but does not exclude other properties, regions, fixed numbers, steps, processes, elements and/or components.

Additionally, the embodiment in the detailed description will be described with sectional views and/or plan views as ideal exemplary views of the present invention. In the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. For example, an etched region illustrated as a rectangle may have rounded or curved features. Areas exemplified in the drawings have general properties, and are used to illustrate a specific shape of a semiconductor package region. Thus, this should not be construed as limited to the scope of the present invention.

Figure 1B:
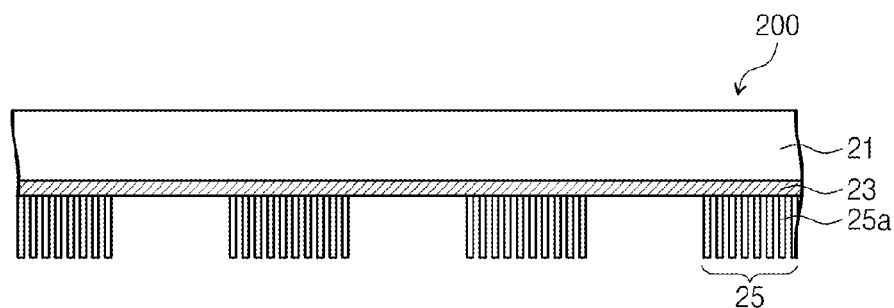
Figure 2:
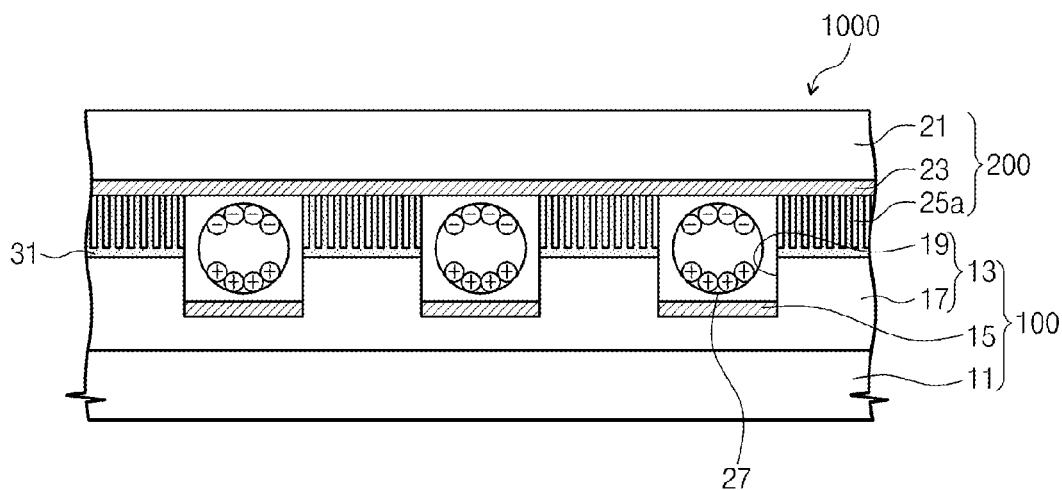
FIG. 2 is a cross-sectional view illustrating a bonded form of the structures of FIGS. 1A and 1B in the electronic paper display according to the embodiment of the present invention.
Figure 3A:
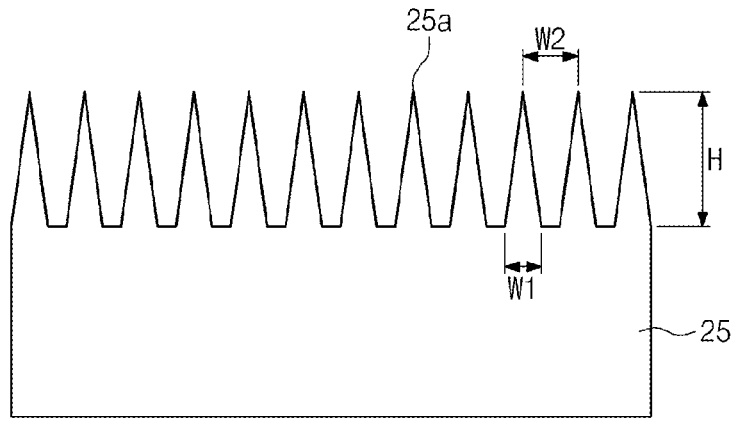
FIGS. 3A through 3C are enlarged cross-sectional views illustrating adhesive fixing parts of FIG. 2 in the electronic paper display according to the embodiment of the present invention.
Figure 3B:
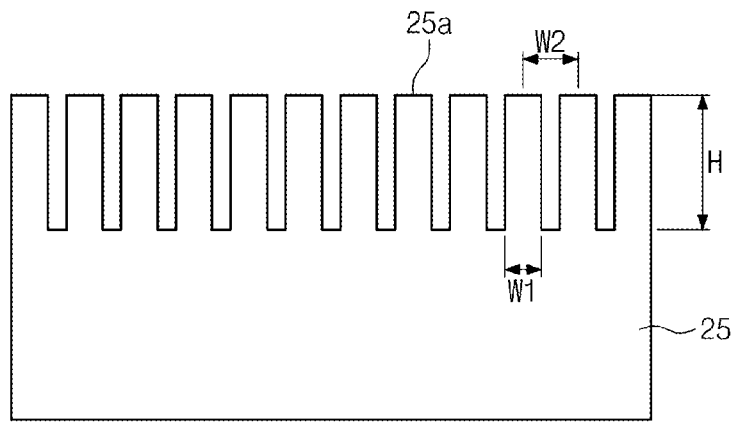
Figure 3C:
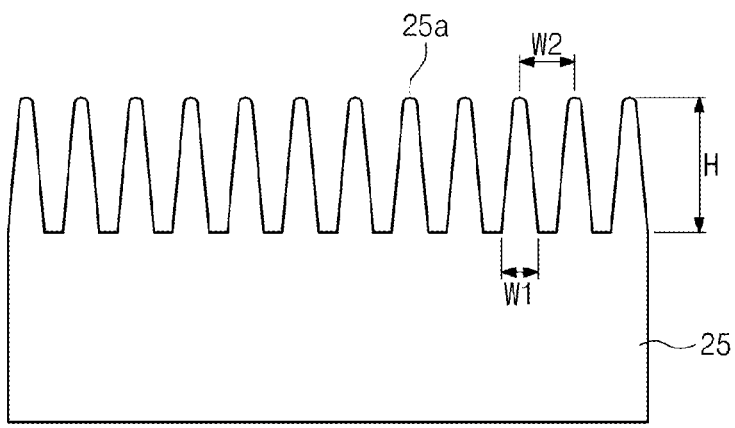

FIGS. 1A and 1B are cross-sectional views illustrating a lower structure and an upper structure of an electronic paper display according to an embodiment of the present invention, respectively. FIG. 2 is a cross-sectional view illustrating a bonded form of the structures of FIGS. 1A and 1B in the electronic paper display according to the embodiment of the present invention. FIGS. 3A through 3C are enlarged cross-sectional views illustrating adhesive fixing parts of FIG. 2 in the electronic paper display according to the embodiment of the present invention.

Referring to FIGS. 1A, 1B, and 2, a lower structure 100 may include a lower substrate 11, a partition wall structure 13, and a lower electrode 15.

The lower substrate 11 may be formed of a flexible material. For example, the lower substrate 11 may be a semiconductor substrate, a glass substrate, a quartz substrate, or a plastic substrate. The lower substrate 11 may include an organic material, an inorganic material, or a polymer. The lower substrate 11 may include thin film transistors (not shown).

The partition wall structure 13 may be disposed on the lower substrate 11.

The partition wall structure 13 is composed of partition walls 17 and cell spaces 19 divided by the partition walls 17. Top surfaces of the partition walls 17 may be bonding surfaces in contact with an upper structure 200 to be later described during bonding.

The cell spaces 19 may be defined by the partition walls 17. The cell spaces 19 may be a single display unit. A lower electrode 15 may be disposed on each bottom surface of the cell spaces 19. The lower electrodes 15 may be connected to the transistors (not shown) to allow a voltage to be applied thereto. The lower electrodes 15 may be formed of a conductive material. According to another embodiment, the lower electrodes 15 may be disposed between the lower substrate 11 and the partition wall structure 13.

Microcapsules 27 including charged pigment particles may be disposed in the cell spaces 19 having the lower electrodes 15 formed therein. The microcapsules 27 may include positive pigment particles 21, negative pigment particles 23, and oil 24. The positive pigment particles 21 and the negative pigment particles 23 may be black pigment particles and white pigment particles, respectively. According to another embodiment, in the case that the electronic paper display is a color electronic paper display, the positive pigment particles 21 may be white or black pigment particles and the negative pigment particles 23 may be blue, yellow, red, or green pigment particles.

The upper structure 200 may include an upper substrate 21, an upper electrode 23, and first adhesive fixing parts 25.

The upper substrate 21 may be provided as a display substrate of the electronic paper display. Thus, the upper substrate 21 may be formed of a light-transmissible material. The upper substrate 21 may be formed of a flexible material. For example, the upper substrate 21 may be a semiconductor substrate, a glass substrate, a quartz substrate, or a plastic substrate. The upper substrate 21 may include an organic material, an inorganic material, or a polymer.

An upper electrode 23 may be provided under the upper substrate 21. For example, the upper electrode 23 may be formed of a conductive polymer, such as polythiophene or polyaniline, particles of metal, such as silver or nickel, a polymer film including the metal particles, indium tin oxide (ITO), or indium zinc oxide (IZO). A voltage opposite to that of the lower electrodes 15 may be applied to the upper electrode 23. As a result, the negative pigment particles 21 and the positive pigment particles 23 move toward the electrodes 15 and 23 having opposite polarity and may display color of the electronic paper display by color included in the particles 21 and 23 reacted with the upper electrode 23.

The first adhesive fixing parts 25 may be disposed under the upper electrode 23. The first adhesive fixing parts 25 may be disposed to correspond to the partition walls 17 included in the partition structure 13. The first adhesive fixing parts 25 may be composed of a plurality of first patterns 25a. The first patterns 25a may have triangular, rectangular and circular shapes. The first patterns 25a may be arranged regularly or irregularly.

Referring to FIGS. 3A through 3C, in the case that the first patterns 25a are regularly arranged, the first patterns 25a having the same shape may be arranged. In this case, a width W1 of the each first pattern 25a, a width W2 between the first patterns 25a, and a height H of the each first pattern 25a may be the same. Alternatively, in the case that the first patterns 25a are irregularly arranged, the first patterns 25a having the same shape may be arranged or the first patterns 25a having different shapes may be arranged. In this case, the width W1 of the each first pattern 25a, the width W2 between the first patterns 25a, and the height H of the each first pattern 25a may be different.

The width W1 of the first patterns 25a, the width W2 between the first patterns 25a, and the height H of the first patterns 25a may be a few nanometers to a few micrometers. The first adhesive fixing parts 25 are not particularly limited, but may be formed of a flexible material, and for example, may be formed of a thermosetting resin or an ultraviolet (UV) curable resin.

Referring again to FIG. 2, the first adhesive fixing parts 25 may be coated with an adhesive 31. Space between the first patterns 25a of the first adhesive fixing parts 25 may be filled with the adhesive 31. After coating the first adhesive fixing parts 25 with the adhesive 31, one surface of the first adhesive fixing parts 25 and the top surface of the partition walls are bonded through a bonding process, and thus, the lower structure 100 and the upper structure 200 may be bonded together.

In the case that the lower structure 100 and the upper structure 200 are bonded together, a surface area of the first adhesive fixing parts 25 is increased by the first patterns 25a and thus, bonding energy between the top surface of the first adhesive fixing parts 25 and the top surface of the partition walls may be increased. As a result, when the lower and upper substrates 11 and 21 are flexible substrates, a separation phenomenon between the substrates due to a bending phenomenon of the lower and upper substrates 11 and 21 may be prevented. Also, the adhesive 31 is absorbed between the first patterns 25a and thus, an amount and a thickness of the adhesive 31 may be controlled. Therefore, an electronic paper display 1000 having improved mechanical strength and durability may be formed. The bonding energy may be determined by the width W1 of the first patterns 25a, the width W2 between the first patterns 25a, and the height H of the first patterns 25a.

Figure 4A:
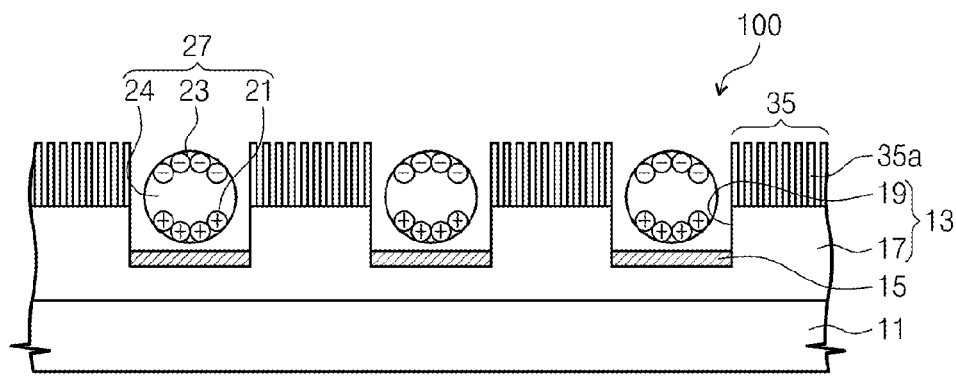
FIGS. 4A and 4B are cross-sectional views illustrating a lower structure and an upper structure of an electronic paper display according to another embodiment of the present invention, respectively.
Figure 4B:
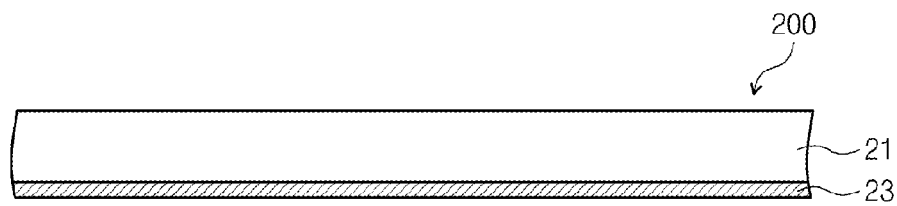
Figure 5:
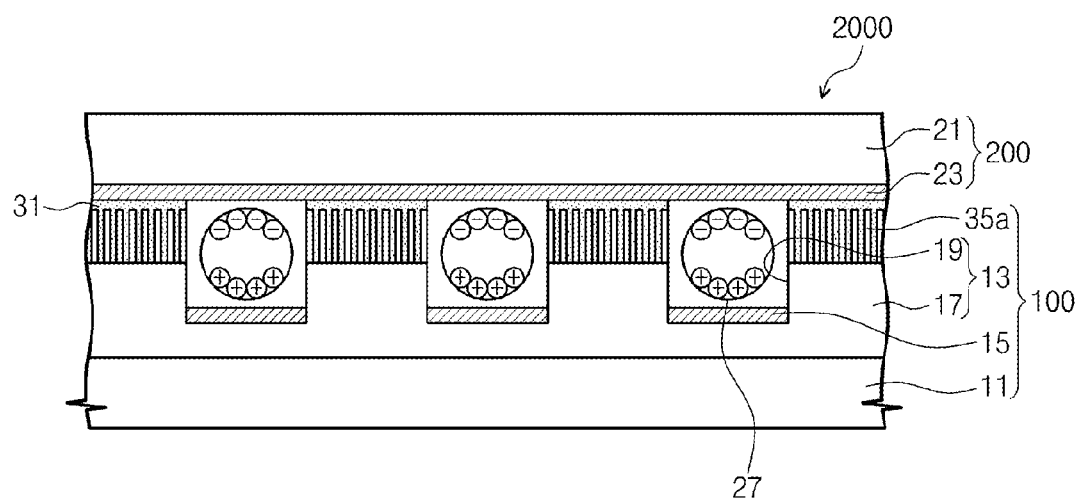
FIG. 5 is a cross-sectional view illustrating a bonded form of the structures of FIGS. 4A and 4B in the electronic paper display according to another embodiment of the present invention.
Figure 6:
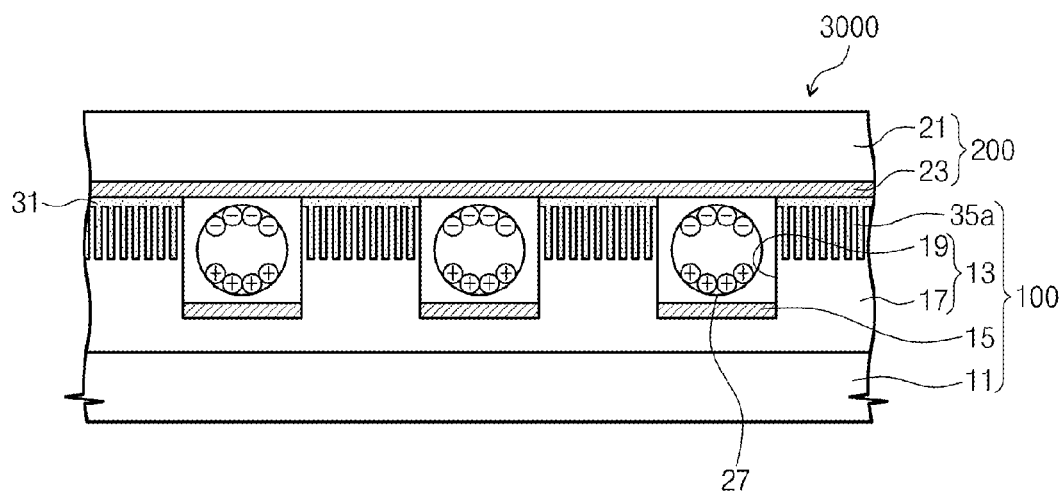
FIG. 6 is a cross-sectional view illustrating a modified example of the electronic paper display according to another embodiment of the present invention.

FIGS. 4A and 4B are cross-sectional views illustrating a lower substrate and an upper substrate of an electronic paper display according to another embodiment of the present invention, respectively. FIG. 5 is a cross-sectional view illustrating a bonded form of the substrates of FIGS. 4A and 4B in the electronic paper display according to another embodiment of the present invention. FIG. 6 is a cross-sectional view illustrating a modified example of the electronic paper display according to another embodiment of the present invention.

In another embodiment illustrated in FIGS. 4A, 4B, 5, and 6, the same reference numerals are used for the substantially same elements as those of the embodiment and descriptions relating to the corresponding elements will be omitted.

Referring to FIGS. 4A, 4B, and 5, the lower structure 100 may include the lower substrate 11, the partition wall structure 13, the lower electrodes 15, and second adhesive fixing parts 35. The upper structure 200 may include the upper substrate 21 and the upper electrode 23.

The partition wall structure 13 may be disposed on the lower substrate 11. The partition wall structure 13 is composed of the partition walls 17 and the cell spaces 19 divided by the partition walls 17. The cell spaces 19 may be a single display unit. The lower electrodes 15 may be disposed on each bottom surface of the cell spaces 19. According to another embodiment, the lower electrodes 15 may be disposed between the lower substrate 11 and the partition wall structure 13.

The microcapsules 27 including charged pigment particles may be disposed in the cell spaces 19 having the lower electrodes 15 formed therein. The microcapsules 27 may include positive pigment particles 21, negative pigment particles 23, and oil 24.

The second adhesive fixing parts 35 may be provided to the top surface of the partition walls 17. The second adhesive fixing parts 35 may be composed of a plurality of second patterns 35a.

The second adhesive fixing parts 35 are coated with the adhesive 31 and an electronic paper display 2000 may then be formed by bonding a top surface of the second adhesive fixing parts 35 and one surface of the corresponding upper electrode 23 together.

According to another embodiment as in FIG. 6, the second patterns 35a may be formed at the same time when the partition wall structure 13 is formed. In particular, the partition wall structure 13 and the second patterns 35a may be substantially formed of the same material. As a result, the second patterns 35a having a plurality of uneven shapes may be formed on the top surfaces of the partition walls 17 of the partition wall structure 13. That is, the second patterns 35a and the partition wall structure 13 may be formed in one piece. Therefore, an electronic paper display 3000 may be formed by bonding one surface of the upper electrode 23 and the top surface of the partition walls 17 having the second patterns 35a formed thereon with the adhesive 31 provided between the second patterns 35a.

Figure 7A:
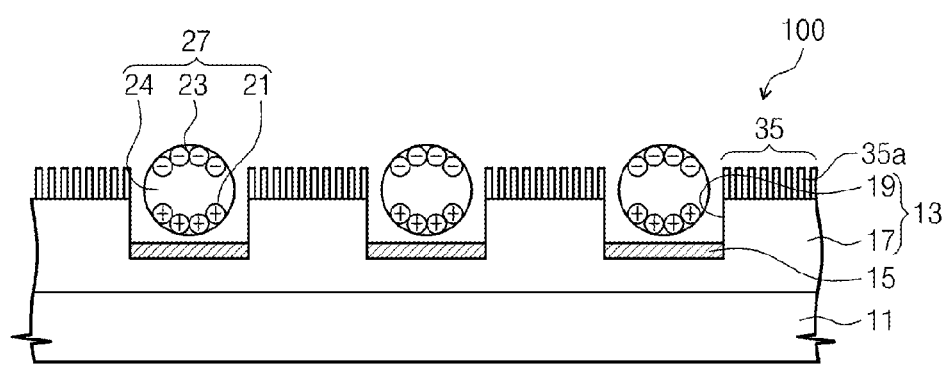
FIGS. 7A and 7B are cross-sectional views illustrating a lower structure and an upper structure of an electronic paper display according to another embodiment of the present invention, respectively.
Figure 7B:
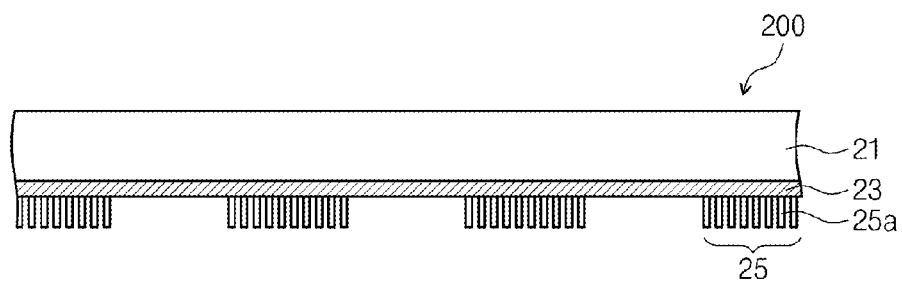
Figure 8:
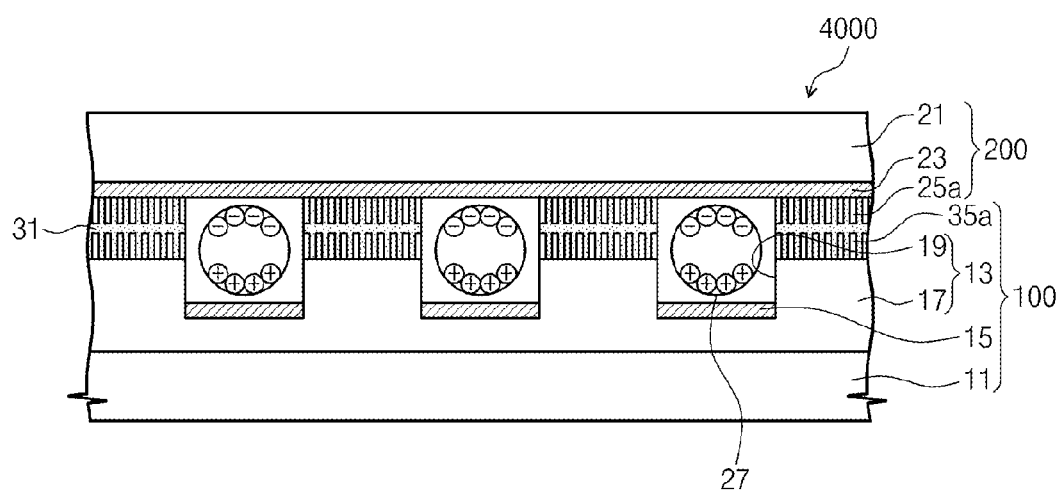
FIG. 8 is a cross-sectional view illustrating a bonded form of the structures of FIGS. 7A and 7B in the electronic paper display according to another embodiment of the present invention.

FIGS. 7A and 7B are cross-sectional views illustrating a lower substrate and an upper substrate of an electronic paper display according to another embodiment of the present invention, respectively. FIG. 8 is a cross-sectional view illustrating a bonded form of the substrates of FIGS. 7A and 7B in the electronic paper display according to another embodiment of the present invention.

In another embodiment illustrated in FIGS. 7A, 7B, and 8, the same reference numerals are used for the substantially same elements as those of the embodiment and descriptions relating to the corresponding elements will be omitted.

Referring to FIGS. 7A, 7B, and 8, the first adhesive fixing parts 25 may be disposed on the top surfaces of the partition walls 17 of the partition wall structure 13 and the second adhesive fixing parts 35 may be disposed at positions on the upper electrode 23 corresponding to the top surfaces of the partition walls 17. The first adhesive fixing parts 25 disposed on the lower structure 100 or the second adhesive fixing parts 35 disposed on the upper structure 200 may be coated with the adhesive 31, or both sides of the first and second adhesive fixing parts 25 and 35 disposed on the lower and upper structures 100 and 200 may be coated with the adhesive 31.

When the first and second adhesive fixing parts 25 and 35 are respectively formed at both sides of the lower structure 100 and the upper structure 200, surface areas of bonding surfaces of the lower and upper structures 100 and 200 are increased. Therefore, an electronic paper display 4000 having more improved bonding characteristics may be formed during a bonding process of the lower structure 100 and the upper structure 200.

Figure 9:
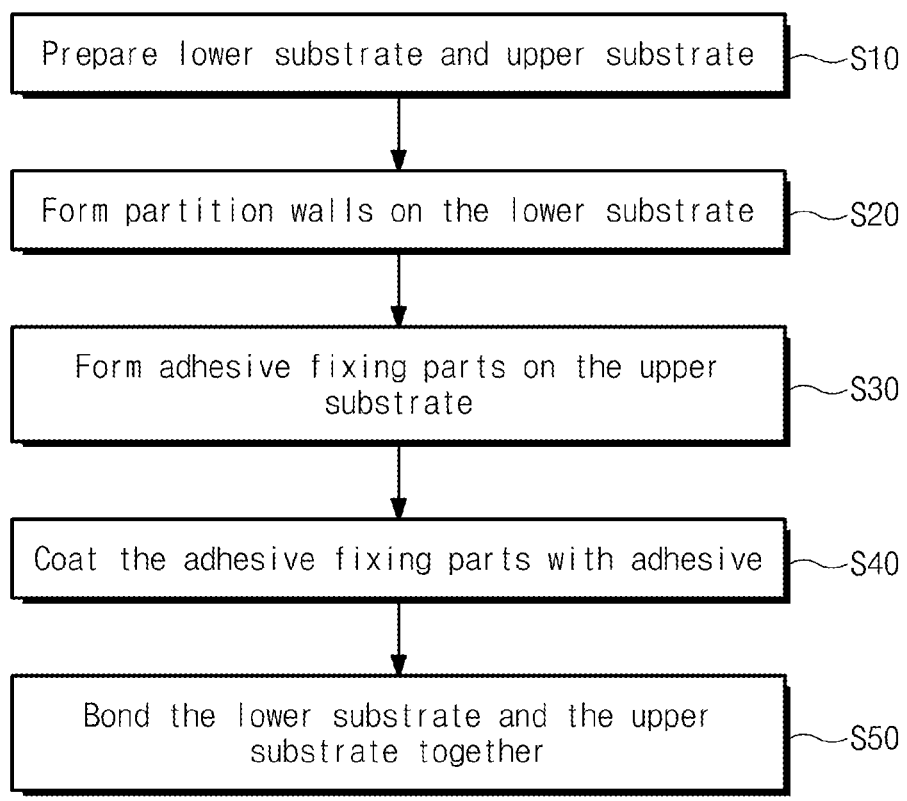
FIG. 9 is a flowchart illustrating a method of fabricating an electronic paper display device according to an embodiment of the present invention.
Figure 10A:
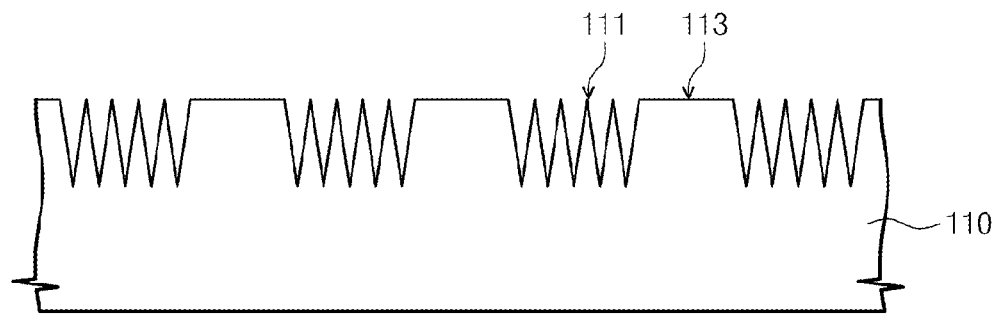
FIGS. 10A through 10D are cross-sectional views illustrating a method of forming adhesive fixing parts in the method of fabricating an electronic paper display device according to the embodiment of the present invention.
Figure 10B:
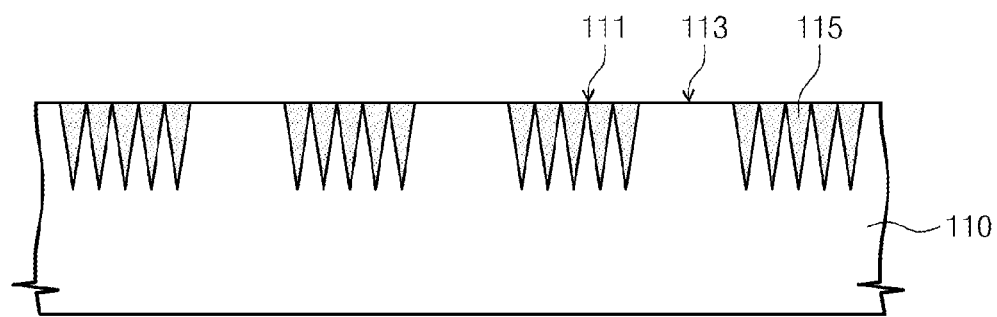
Figure 10C:
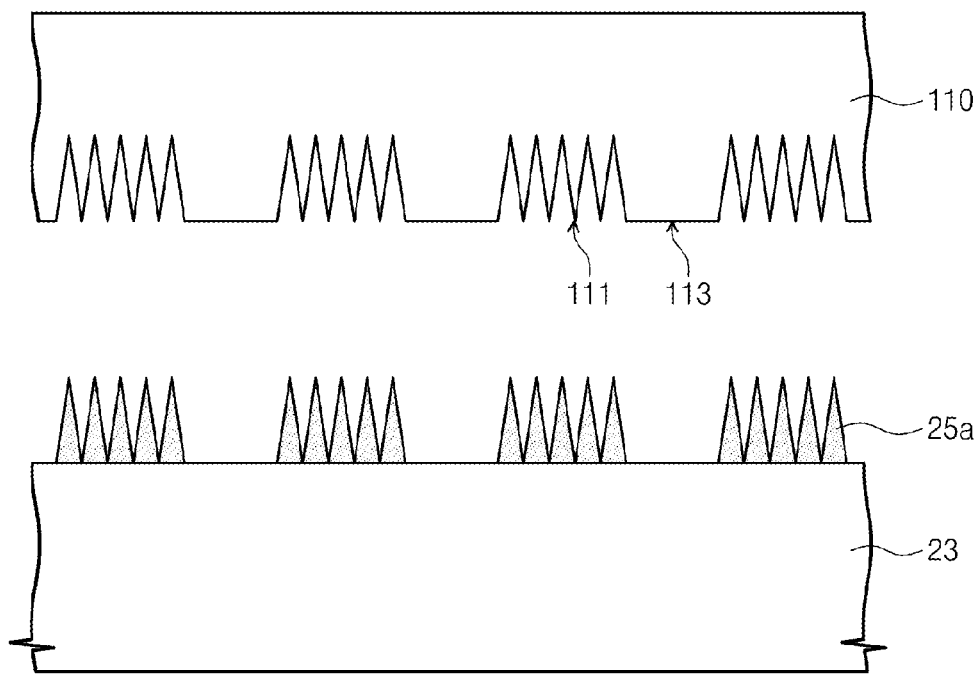
Figure 10D:
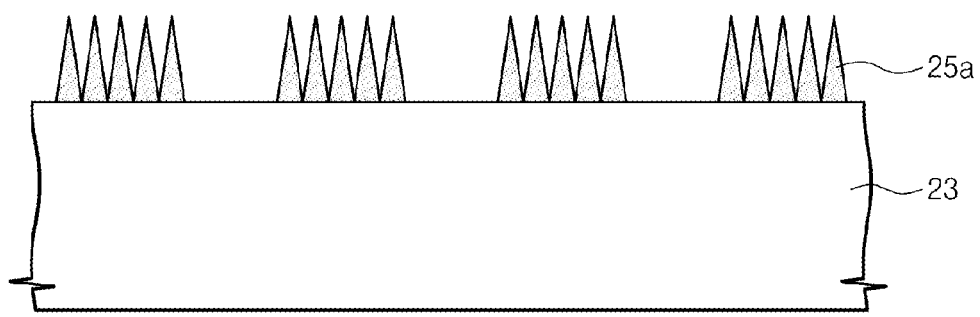
Figure 11A:
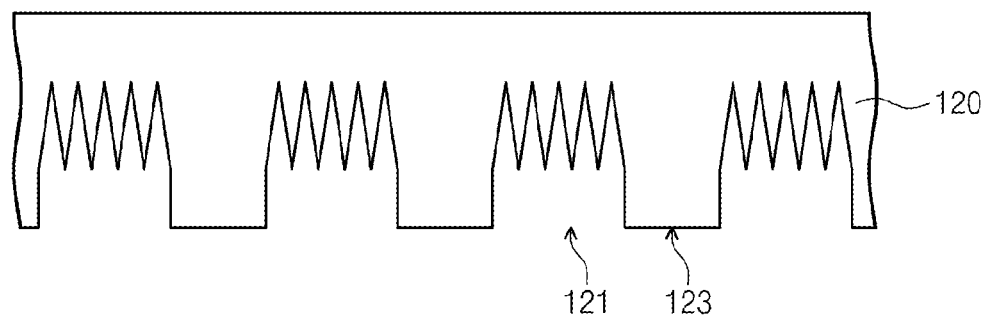
FIGS. 11A through 11D are cross-sectional views illustrating a method of forming partition walls including patterns in a method of fabricating an electronic paper display device according to another embodiment of the present invention.
Figure 11B:
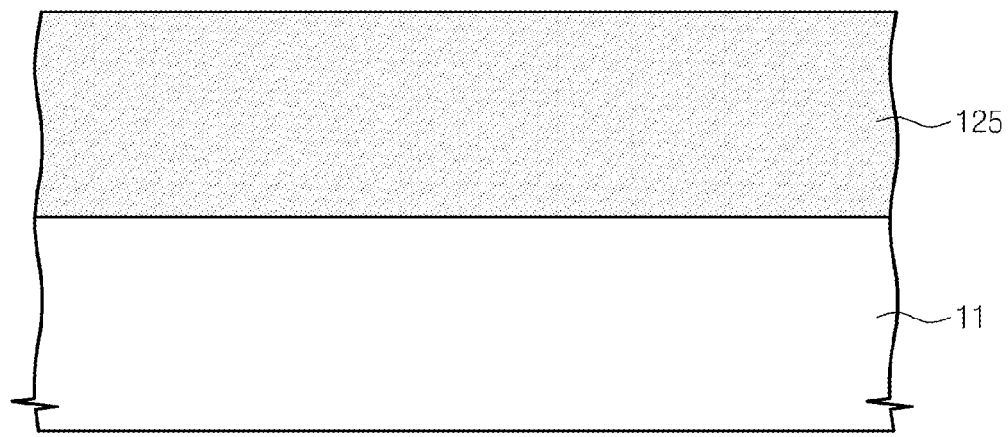
Figure 11C:
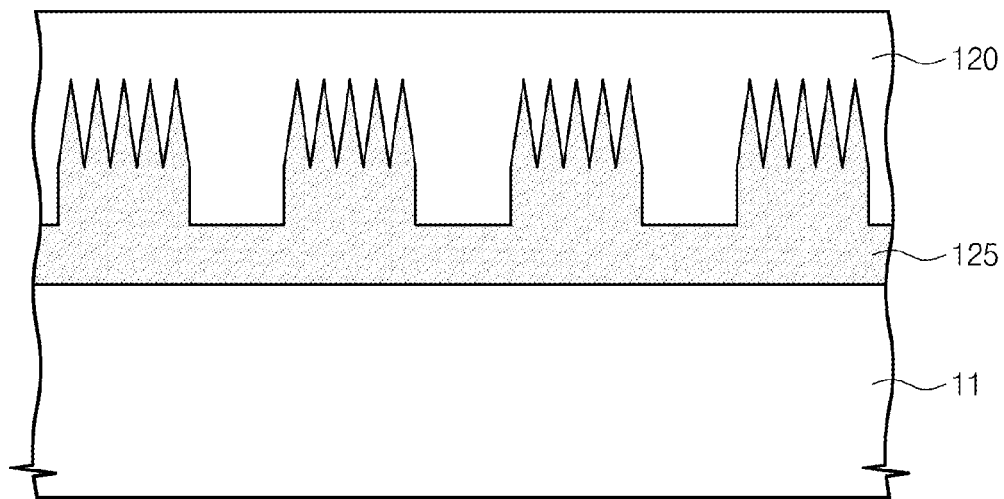
Figure 11D:
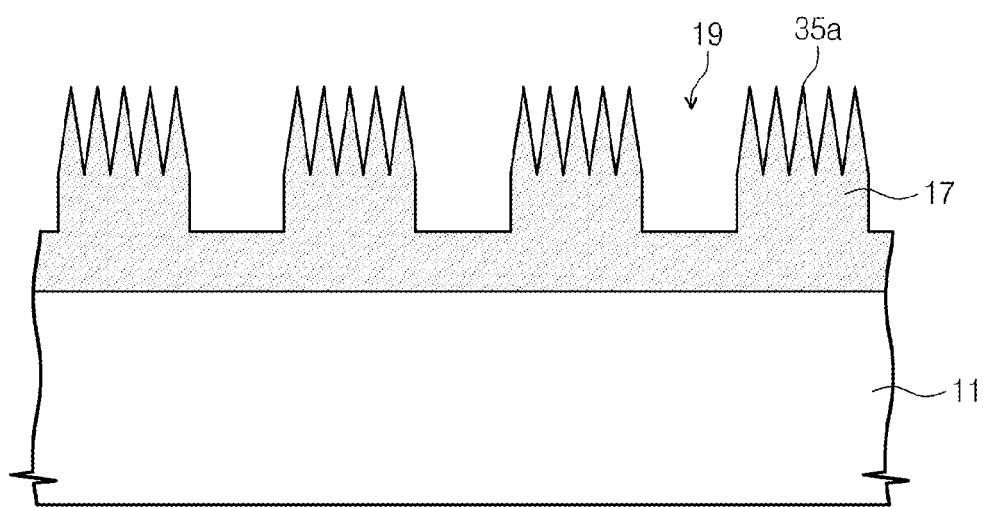

FIG. 9 is a flowchart illustrating a method of fabricating an electronic paper display device according to an embodiment of the present invention. FIGS. 10A through 10D are cross-sectional views illustrating a method of forming adhesive fixing parts in the method of fabricating an electronic paper display device according to the embodiment of the present invention.

Referring to FIGS. 2 and 9, a lower substrate 11 and an upper substrate 21 are prepared (S10). The lower substrate 11 and the upper substrate 21 may be formed of a flexible material. For example, the lower substrate 11 and the upper substrate 21 may be a semiconductor substrate, a glass substrate, a quartz substrate, or a plastic substrate. The lower substrate 11 and the upper substrate 21 may include an organic material, an inorganic material, or a polymer. The lower substrate 11 may include thin film transistors (not shown).

Partition walls 17 may be formed on the lower substrate 11 (S20).

In particular, the partition walls 17 may be formed by using a screen printing method, a roll coating method, an inkjet coating method or an imprinting method. The partition walls 17 may be formed by using a photoreactive material and for example, may be formed of a thermosetting resin or an UV curable resin. When the partition walls 17 are formed, cell regions 19 may be simultaneously formed between the partition walls 17. Bottom surfaces of the cell regions 19 may be formed to be disposed above a top surface of the lower substrate 11. The partition walls 17 and the cell regions 19 may constitute partition wall structures 13.

A lower electrode 15 may be formed on the bottom surface of the cell regions 19. The lower electrode 15 may be formed by using a chemical vapor deposition (CVD) method or a physical vapor deposition (PVD) method. For example, the lower electrode 15 may include a conductive polymer, such as polythiophene or polyaniline, particles of metal, such as silver or nickel, a polymer film including the metal particles, indium tin oxide (ITO), or indium zinc oxide (IZO). According to another embodiment, the lower electrode 15 may be formed on the lower substrate 11.

Microcapsules 27 may be injected into the cell regions 19 having the lower electrode 15 formed therein. The microcapsules 27 may be injected into the cell regions 19 by using a liquid dispenser.

First adhesive fixing parts 25 are formed on the upper substrate 23 (S30).

The first adhesive fixing parts 25 may be formed on the upper substrate 23 to correspond to top surfaces of the partition walls 17. The first adhesive fixing parts 25 may have a plurality of uneven shapes.

In particular, referring to FIGS. 10A to 10D, a method of forming the first adhesive fixing parts 25 may include preparing a printing plate 110 composed of uneven portions 111 and even portions 113 having a flat surface between the uneven portions 111, coating the printing plate 110 with a curable material 115 to fill the uneven portions 111, pressing the printing plate 110 having the curable material 115 included therein onto the upper substrate 23 to form first patterns 25a formed of the curable material 115 on the upper substrate 23, and curing the first patterns 25a. Regions having the first adhesive fixing parts 25 formed therein may be regions having an adhesive 31 disposed thereon in a subsequent process and regions not having the first adhesive fixing parts 25 formed therein may be regions having the microcapsules 27 disposed thereon. The curable material may be a UV curable resin and a thermosetting resin (e.g., polyurethane acrylate (PUA) or polydimethylsiloxane (PDMS)). The first patterns 25a may be formed regularly or irregularly. The first patterns 25a may be formed to have a triangular, rectangular, or circular shape. The shape of the first patterns 25a depends on a pattern shape of the uneven portions 111 of the printing plate 110.

According to another embodiment of the present invention, second adhesive fixing parts 35 may be formed on a top surface of the partition walls 17.

In particular, referring to FIG. 5, when the printing plate 110 having the curable material 115 disposed on the uneven portions 111 is prepared by using the same method as that of forming the first adhesive fixing parts 25, and the uneven portions 111 of the printing plate 110 are disposed to correspond to the top surfaces of the partition walls 17 and pressure is then applied to the partition walls 17, the second adhesive fixing portions 35 composed of second patterns 35a may be formed on the partition walls 17. As a result, an electronic paper display device including the first adhesive fixing parts 25 composed of the first patterns 25a and the second adhesive fixing parts 35 composed of the second patterns 35a may be formed as illustrated in FIG. 8. The first patterns 25a and the second patterns 35a may have the same shape or may have different shapes.

According to another embodiment of the present invention, when the partition walls 17 are formed, the partition walls 17 may be formed to include second patterns 35a on top surfaces of the partition walls 17.

Referring to FIGS. 6 and 11A through 11D, a method of forming partition walls 17 including the second patterns 35a includes preparing a printing plate 120 composed of uneven portions 121 and even portions 123 having a step height higher than a surface of the uneven portions 121 and a flat surface between the uneven portions 121, coating a lower substrate 11 with a photoreactive material layer 125, pressing the printing plate 120 onto the photoreactive material layer, and removing the printing plate 120 from the photoreactive material layer to form the partition walls 17 composed of the second patterns 35a. As a result, the second patterns 35a may be formed in regions of the photoreactive material layer 125 corresponding to the uneven portions 121 and cell regions 19 may be formed in regions of the photoreactive material layer corresponding to the even portions 123.

Referring again to FIGS. 2 and 9, the first adhesive fixing parts 25 are coated with an adhesive 31 and the lower substrate 11 and the upper substrate 21 are then bonded together (S40, S50).

In particular, the adhesive 31 is provided on the first adhesive fixing parts 25 and may be disposed between the first patterns 25*a*. As a result, the adhesive 31 does not flow into the cell region 19.

In the bonding process, the adhesive fixing parts 25 coated with the adhesive 31 and the partition walls 17 corresponding to the adhesive fixing parts 25 are in contact with each other and any one side of the upper substrate 21 and the lower substrate 11 may be rubbed with a roller (not shown) or both sides of the upper substrate 21 and the lower substrate 11 may be rubbed with a roller (not shown).

An electronic paper display device according to an embodiment of the present invention and a method of fabricating the same may include adhesive fixing parts formed of patterns on a lower structure and/or an upper structure. The patterns may have a width ranging from a few nanometers to a few micrometers. That is, a specific surface area of the adhesive fixing parts may be increased. As a result, when the upper structure and the lower structure are bonded together by coating the adhesive fixing parts with an adhesive, bonding energy between the upper structure and the lower structure may increase. Therefore, since a separation phenomenon in a bonding portion due to a bending phenomenon of the lower and upper substrates may be prevented, an electronic paper display having improved mechanical strength and durability may be formed. Also, the adhesive may be absorbed between the patterns and thus, an amount and a thickness of the adhesive may be controlled.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, the preferred embodiments should be considered in descriptive sense only and not for purposes of limitation.

What is claimed is:

1. An electronic paper display device comprising:
   a first substrate;
   partition walls defining cell regions disposed on the first substrate;
   a first electrode disposed on a bottom surface of the cell regions;
   microcapsules disposed on the first electrode;
   a second electrode having one side facing the first electrode; and
   a second substrate disposed on the other side of the second electrode,
   wherein the electronic paper display device comprises first adhesive fixing parts including a plurality of patterns provided between the second electrode and the partition walls.

2. The electronic paper display device of claim 1, wherein the first adhesive fixing parts are provided by being adhered to the second electrode.

3. The electronic paper display device of claim 2, further comprising second adhesive fixing parts provided by being adhered to the partition walls.

4. The electronic paper display device of claim 1, wherein the first adhesive fixing parts are provided by being adhered to the partition walls.

5. The electronic paper display device of claim 1, wherein the first adhesive fixing parts have a plurality of unevenness formed on a top surface of the partition walls.

6. The electronic paper display device of claim 1, wherein the microcapsule comprises charged pigment particles and oil.

7. A method of fabricating an electronic paper display device, the method comprising:
   preparing a first substrate and a second substrate;
   forming partition walls defining cell regions on the first substrate;
   forming first adhesive fixing parts facing the partition walls on the second substrate;
   coating the first adhesive fixing parts with an adhesive; and
   using the adhesive to bond the first substrate and the second substrate together,
   wherein the first adhesive fixing parts are composed of a plurality of patterns.

8. The method of claim 7, the forming of the first adhesive fixing parts comprises:
   preparing a printing plate composed of uneven portions and even portions having a flat surface between the uneven portions;
   coating the printing plate with a curable material to fill the uneven portions;
   pressing the printing plate having the curable material included therein onto the second substrate to form a plurality of patterns formed of the curable material on the second substrate; and
   curing the patterns.

9. The method of claim 7, further comprising forming second adhesive fixing parts on a top surface of the partition walls.

10. The method of claim 7, wherein the coating of the first adhesive fixing parts with an adhesive comprises completely filling between the patterns with the adhesive.

11. The method of claim 7, further comprising:
    forming a first electrode on a bottom surface of the cell regions before the first substrate and the second substrate are bonded together;
    injecting microcapsules onto the first electrode; and
    forming a second electrode on the second substrate to face the first electrode.

12. A method of fabricating an electronic paper display device, the method comprising:
    preparing a first substrate and a second substrate;
    forming partition walls defining cell regions on the first substrate and having a plurality of patterns disposed on a top surface thereof;
    providing an adhesive to the top surface of the partition walls; and
    using the adhesive to bond the first substrate and the second substrate together.

13. The method of claim 12, wherein the forming of the partition walls comprises:
    preparing a printing plate composed of uneven portions and even portions having a step height higher than a surface of the uneven portions and a flat surface between the uneven portions;
    forming a photoreactive material layer on the first substrate; and
    pressing the printing plate onto the photoreactive material layer to form first patterns on the first substrate.

14. The method of claim 12, further comprising forming adhesive fixing parts composed of a plurality of second patterns on the second substrate to face the top surface of the partition walls.

15. The method of claim 14, wherein the adhesive is provided to fill between the first patterns and between the second patterns.

* * * * *